June 10, 1958     C. P. PORTERFIELD     2,838,652
METHOD AND APPARATUS FOR SPARK MACHINING
Filed Aug. 30, 1955
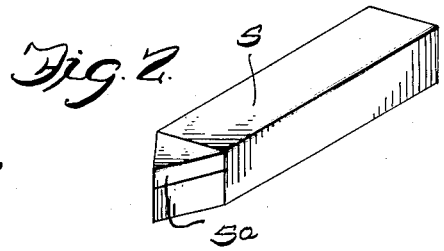
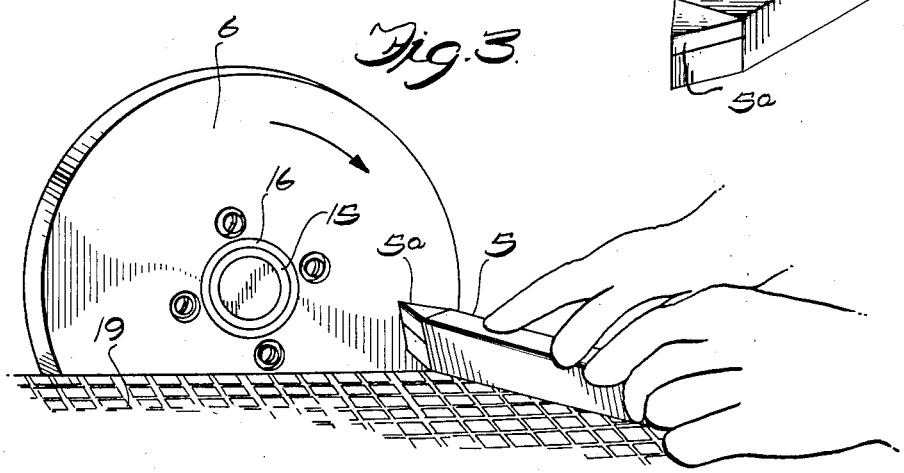
Inventor
Cecil P Porterfield
Carlson, Pitzner, Hubbard, & Wolfe
Attorneys

United States Patent Office 2,838,652
Patented June 10, 1958

2,838,652

METHOD AND APPARATUS FOR SPARK MACHINING

Cecil P. Porterfield, Pittsburgh, Pa., assignor, by mesne assignments, to Firth Sterling Inc., Pittsburgh, Pa., a corporation of Pennsylvania Application August 30, 1955, Serial No. 531,327

6 Claims. (Cl. 219—69)

This invention relates to the art of spark machining, also known as electro-erosion, in which particles are dislodged from a conductive workpiece by overvoltage-initiated time-spaced spark discharges through a dielectric medium in the spark gap defined between an electrode and a conductive workpiece.

A particular utility of spark cutting for machining extremely hard materials such as tungsten carbide and hard steel alloys follows from the fact that the contour of the workpiece can be made complementary to the contour of the shaping electrode, even though the electrode is of a softer material and does not contact the workpiece. A liquid, usually a hydrocarbon, having dielectric properties is maintained in the spark gap between the electrode and the workpiece and is necessary to obtain the short, high current sparks found effective for practical machining rates and to avoid the ineffective sparking or prolonged heating arc which would occur in air. In addition the liquid dielectric, which is necessarily self-restoring after each discharge, also entrains the small removed particles and helps to carry them away. To maintain the very small gap spacing (usually tenths of a thousandth of an inch or less) and without causing short circuit, either directly or through the dislodged particles, an automatic feed control mechanism is often employed.

The present invention is directed to "outside" spark machining operations in which a shaping electrode surface moves transversely across the workpiece surface being machined. The workpiece in such operations is often a conventional cutting tool made of steel or steel with a tungsten carbide tip insert, which is to be shaped or resharpened. The shaping electrode surface characteristically conveniently takes the form of a metal wheel or disk having a surface of revolution which is large with respect to the workpiece surface to be finished. Such electrode is often called a "spark grinding" wheel although it will be understood there is no actual workpiece to wheel contact, much less a grinding action.

Such spark grinding wheels are inexpensive and easily dressed. Diamond wheels, on the other hand, which have been required for grinding tungsten carbide tool tips are much more expensive and difficult to maintain.

Problems have arisen, however, in the use of such "spark grinding" wheels for convenient shop use. Even though simplified and economically feasible, however, the apparatus meets other objections. The dielectric liquids essential to the spark machining apparatus are difficult to retain on the surfaces of the wheel. While continuous liquid feed systems and guards for most of the wheel surfaces may be added, a spray is generated and at the spark cutting region where the maximum sight is desired. The waves of the liquid which tend to flow radially across the surface of the wheel obscure the cutting operation. The dielectric liquid scooped from the wheel by the workpiece being ground also causes a good deal of splatter to make it virtually impossible to maintain an adequate housekeeping standard.

The hazard involved is not an electrical one, but the cutting spark may ignite the mist produced by the liquid dielectric thrown away from the wheel and create a severe fire hazard.

It is therefore an object of my invention to provide an "outside" spark machining apparatus in which the foregoing problems are overcome and the apparatus is simply and inexpensively kept free of dielectric liquid spray and fire hazard. It is likewise an object to provide a convenient and safe method of spark machining which simplifies the apparatus requirements.

Generally speaking, I have approached the solution to the problem by applying a dielectric in a semisolid state so that the liquid or vapor states are avoided except at and during the individual localized spark discharge. I have further found that the maintenance of an adequate dielectric supply is at the same time further simplified by the use of a porous shaping electrode material.

Various objects and advantages will become apparent as the following detailed description proceeds, taken together with the accompanying drawings in which, Fig. 1 is a semi-schematic representation of a spark powering circuit suitably employed in the practice of my invention, together with a representation of a "spark grinding" spark machining apparatus.

Fig. 2 is a perspective view illustrating a carbide tipped tool representative of workpieces advantageously shaped or sharpened in accordance with my invention.

Fig. 3 is a simplified perspective view illustrating the spark machining operation with the apparatus of Fig. 1.

While the invention is susceptible of various modifications and alternative constructions, there is shown in the drawings and will be herein described in detail the various preferred embodiments. It is to be understood that it is not thereby intended to limit the invention to the forms disclosed but on the other hand, it is intended to cover all modifications, alternative constructions and equivalents within the spirit anrd scope of the invention as expressed in the appended claims.

Referring first to the spark powering circuit, a capacitor is periodically charged from a charging source and then discharged in a short period through the spark gap defined between two electrodes, the anodic one being the workpiece and the other being a cathodic shaping tool. To avoid confusion with the workpiece which is often itself a cutting tool, the cathodic electrode is herein referred to simply as the electrode or shaping electrode. With a suitable dielectric medium in the space between the electrodes the capacitor can be discharged or the resulting discharge across the spark gap is completed in a very short time, usually a few microseconds, at very high peak currents. The circuit 1 illustrated in Fig. 1 is an example of one of those which may be employed. Thus a direct current power source 2, which is suitably a full wave rectifier, has its terminals connected to a storage capacitor 3. A charging resistor 4 in one of the conductors between the source 2 and the capacitor limits the charging current rate to a safe value. The positive terminal of the capacitor is connected to the workpiece 5 which, as previously mentioned, is commonly a machine tool bit which is to be sharpened and is preferably at ground potential to assure an adequate standard of safety. The negative terminal of the capacitor is connected to the shaping electrode 6 which in this case is shown as a rotary disk. A unidirectional conducting device 7 is optionally connected in series with the spark gap so formed, in this case being shown between the negative terminal of the capacitor and the workpiece. The device 7 is polarized to pass current in the assigned forward direction and to block reverse oscillatory currents. Because of the very high peak currents that are conducted during the discharge of the capacitor, this particular charging circuit with a 160 volt direct current source, a 16 ohm charging resistor, and a four micro-farad capacitor, produced spark discharges approximately three microseconds in duration at a repetition rate of 20,000 times per second. The diode 7 in this case suitably took the form of eight half-units in parallel of four type 1N158 germanium twin diodes. The average current during operation was in the rang of 6 to 8 amperes and this, with the aid of the oscilloscope observations, indicated peak discharge currents in the vicinity of 250 to 300 amperes. The repetition is automatic, in the nature of a relaxation oscillator, the dielectric medium between the workpiece and the electrode temporarily breaking down and permitting spark-over when the capacitor voltage has built up to a sufficiently high voltage. Circuits may also be employed without the rectifier 6. It is not necessary that the spark powering circuit be of the particular type employed nor restricted to the current rating here mentioned. Higher power circuits in which the spark repetition rate is independently timed so that a voltage pulse is applied to the spark gap at spaced time intervals may be substituted. Similar considerations apply, however, and it is vitally important in each situation that discharge take place through a dielectric whose electrical properties permit the high current densities associated with effective and efficient material removal.

In the apparatus shown associated with the circuit in Fig. 1, the smooth-surfaced rotary electrode wheel 6 is sufficiently massive to prevent any vibration or flexing of the wheel and to provide an ample surface or material reserve for redressing the sides or rim of the wheel when employed as an off-hand grinder. A cast iron wheel of 10 inches diameter approximately ½ to 1 inch thick, has been found satisfactory for general application. The wheel is mounted on the shaft 8 of a motor 9 and adequately journaled to prevent vibration or wobble.

Insulating the motor from the spark powering circuit 1 is simplified by an arrangement such as that illustrated in detail in Fig. 1. As shown a base 10 for the apparatus defines a shelf 11 on which the motor is mounted. A shield 12 for the rear portion of the base may be incorporated to enclose the motor and has a vertical partition or wall 13 through which the shaft 8 extends toward the front of the base. A ball bearing assembly 14 has an inner race fitted over the shaft and the outer race is mounted on the wall 13 to journal the shaft extension and minimize end play. An insulating bushing 15 on the extending end of the shaft suitably carries a flanged metal bushing 16 fitted over it, the flange 17 being positioned adjacent the wall but insulatingly spaced from it. A brush 18 for providing electrical contact to the rotary wheel suitably rides on the conducting flange 17, the brush being insulatingly supported from the vertical wall. This is the cathode connection for the spark discharge circuit and is connected therefore to the negative ungrounded terminal of the charging capacitor.

The wheel or disk electrode itself has a center aperture enabling it to be fitted over the conductive bushing 16 and against the flange 17, being preferably bolted to the flange. The wheel presents both its front surface (exclusive of the center bushing aperture) for off-hand grinding and its rim or periphery for grinding where the narrower surface of revolution can be conveniently employed.

A conductive work table 19 is positioned adjacent but spaced from the front and rim surfaces of the wheel, being suitably horizontally alined with the wheel somewhat below its center so as to present a large transverse area for the machining process. The table is preferably pivotally mounted with respect to the base so that it can be adjusted to various angles, an adjustable pivot mounting 20 being shown in Fig. 1. The table and the base are both at ground potential, which is that of the positive electrode of the capacitor 3. A flexible cable 21 may be additionally connected to the table and a copper clip 22 on the cable is adapted to be clipped to the workpiece. The latter is principally a precautionary measure since the workpiece when lying on the table is at ground potential and thus connected in the circuit until lifted from the table. A pull-out drawer 23 located in the base collects any material thrown off the face of the wheel down into the drawer in the space between the wheel and the table.

In operation a tool 5 to be sharpened such as that shown in Fig. 2 and having a carbide tip insert 5a, is positioned on the table adjacent a downwardly descending portion of the electrode wheel. In this case, with the wheel turning at approximately 1750 revolutions per minute in a clockwise direction as viewed in Fig. 3, the tool is positioned near the right hand portion of the wheel front surface.

In accordance with my invention, I have found a surprisingly efficient and effective dielectric material and mode of applying it which has far reaching results in economy, ease of operation, and safety. These advantageous results are coupled with the use of what may be termed a semi-solid dielectric material.

One material found particularly suitable is a semisolid petrolatum, i. e., microcrystalline petroleum wax. These waxes are difficult to describe in terms of exact hydrocarbon analysis because their properties vary with the crude oil source, the fractions of the crude from which they are separated, and the refining technique. Those particularly composed and derived waxes in this classification which are of interest here are a soft solid or plastic (semi-solid) at room temperature and pliable without fracture as contrasted with refined paraffin wax. While the melting points of such residual source microcrystalline waxes are generally grouped in the 140 degree to 200 degree F. range, the properties of the microcrystalline waxes tested and which were found particularly desirable are those generally attributed to the microcrystalline waxes produced from the residual oil rather than from motor oil distillate or crude oil tank bottom. These characteristic properties are ductility, tenaciousness, and toughness with high adhesiveness and flexibility over a wide temperature range. Such waxes, as contrasted with paraffin (macrocrystalline) wax, for example, are plastic and shear without crumbling. The wax, because of its flexible semisolid characteristic, does not fly off the rotating wheel, but instead adheres to it and appears to be a uniform, very thin film over the entire wheel surface. It is believed that the wax penetrates the cast iron to some extent due to its porosity and is thus retained in larger amounts without removal.

One such microcrystalline wax which has been found very satisfactory is Socony-Vacuum wax No. 2310. It has the desired plasticity (melting point of approximately 160 degrees F.). Another microcrystalline wax with a lower melting point in the vicinity of 125 degrees F. and with correspondingly desired increased softness is that supplied as Imperial Oil Co. wax No. 8H–3. Waxes with much lower melting points are usually too close to the liquid phase and subject to splattering, however.

A wax may be very simply manually applied to the wheel by simply wiping a rag containing a lump of the wax against the rotating wheel. Only a small amount is required to adequately film the surface. Thus the wheel may be wiped apparently clean of wax but the film remaining on it is adequate for fast and effective spark machining. Due to the semisolid condition of the wax at room temperature, the wheel does not have to be heated in order to apply the wax nor does the wax run off the wheel.

A mechanical means for applying the wax is also shown in Fig. 1. As may be seen there, a hollow cylinder 24 is stationed on the base in front of the wheel and below the table. A wiper ring 25, suitably made of fiber glass is positioned around the end of the cylinder near the wheel and bears against a portion of the wheel surface below the table. The cylinder is filled with the semisolid dielectric material to be used and an ejector or piston 26 at the end of the cylinder opposite the wiper end is advanced to force wax against the wheel when the film thereon needs replenishing. To control the wax application the piston is preferably threaded into the cylinder and has an actuating handle 27 which is turned or rotated a small amount each time the operation is to be performed.

The cutting rate, when using the wax, is high and entirely satisfactory and is not limited to a particular workpiece metal. For example, both the tungsten carbide insert and the cold rolled steel shank of the tool of Fig. 2 may be simultaneously spark machined. No prior undercutting of the steel shank is required as would be the case where the carbide is to be machined by a diamond wheel. The standard of performance so far as the cutting rate is concerned is that of kerosene or the heavier filming oils of the viscosity and types commonly sold as automobile motor lubricants. The wax was found just as effective in material removed in a five minute test and did not require continuous application as did the kerosene and oil. The wax filmed wheel even after the five-minute test was still effective. Observations may be made directly, in addition to measuring or weighing the amount of material removed, by simply observing the brightness and sound of the spark. If the spark is "fat" and makes a sharp snap as in the kerosene or oil tests, then it may be safely concluded that the instantaneous cutting rate is at or near its maximum value. When the spark sound and light grow fainter, the spark cutting power is likewise decreased. The visual monitoring of the spark is not impeded by the thin wax film and the workpiece location or applied pressure are readily adjusted. Continuous high pressure on the workpiece for several minutes will eventually produce a short circuit which is indicated not only by the elimination or decrease in the spark brightness and sound but also by the ringing sound of the metal to metal contact.

The wax permits a very simple means of operation since the wax film itself mechanically spaces the workpiece from the wheel. In operation, the tool to be sharpened or otherwise machined, is placed on the work table and advanced toward the rotating wheel. When a surface of the workpiece is brought to bear lightly against the wheel, the wax film prevents the metal to metal contact, as indicated usually by the absence of a ringing sound. With the spacing thus determined by the film on the wheel, sparking occurs, each spark occurring at a much different position of the wheel as may be appreciated by the time spacing between sparks and the filmed wheel surface moving transversely across the workpiece surface. The wheel is locally heated at the spark location and wax film is automatically maintained or replaced at each sparked area. By a series of thousands of such separate spark removals or erosions the workpiece surface is everywhere removed. An appreciation of the small magnitude of forces or pressures involved and of the ease of positioning and holding the workpiece is illustrated by the fact that the workpiece may be simply placed against the filmed wheel surface and left resting on the table without applying any further mechanical or manual force. The workpiece is not disturbed in its position by the rapidly moving wheel surfaces and the sparking will continue until the surface is "sparked out" and the workpiece is advanced for another cut. Heavier pressures may be applied, however, since the wax film is not readily scooped from the surface and any elemental bare areas appear to refilm in their revolution about the wheel axis before again intervening between the workpiece and the wheel.

An important and significant result in the use of the semisolid wax mentioned is the elimination of spray or mist, together with a vast simplification of the housekeeping problems and elimination of fire hazard. The latter is particularly significant. The mist is formed when a liquid on the wheel employed as the dielectric strikes the tool. Such a liquid also prevents close observation of the cutting operation and spreads the kerosene or oil around the work area and on the operator. Since the production of a spray and the maintenance of a spark define the conditions for efficiently burning even a high flash point liquid, it may be seen that the use of the semisolid material is very advantageous in this respect. At the same time the tests have indicated the advantages of the electrical characteristics of the liquid hydrocarbon dielectrics are retained. Presumably the wax is converted to the fluid state at each local spark area, but each such section of the wheel is rapidly moved through the spark gap area. A very small splatter appears to be caused by the spark itself rather than by a scooping action of the workpiece, but the downwardly directed particles are collected under the workpiece in the tray 23.

It has been observed that the sparking cannot be as consistently maintained over a period of time without a more careful pressure feed of the tool and replenishing of the wax when a steel wheel or when a brass wheel is employed. This is attributed to the porosity of the cast iron wheel. Examination of different cast iron wheels tested indicates that those requiring the less wax application and less attention to maintain the cutting rate had a larger degree of porosity, preferably with inter connecting pores. This is not to say that the wheel surface is rough as the pores are small and do not cause a palpable departure from planeness or smoothness. Thus, even though the wheel may become heated after prolonged use and high spark powers, the wax is absorbed in the wheel and is not slung off. Instead the wax tends to be better distributed and to replenish itself upon the face of the wheel as the machining proceeds. Wheels which are porous by a sintering process of manufacture are also indicated as desirable because of their superior wearing properties.

Other dielectric materials have also been employed.

Another example of a wax, although not available in bulk and at the low cost as in the case of the preferred microcrystalline wax, found satisfactory in a proprietary product in stick form for use in lubricating dies for pipe threading operations, and supplied to the trade as Johnson's No. 140 "Stik Wax" supplied by S. C. Johnson and Son, Inc. of Racine, Wisconsin. This wax, along with the microcrystalline wax exhibited the desirable properties previously mentioned of easy application to the wheel while cold not found in such waxes as the refined paraffin wax. The microcrystalline wax, however, has been available.

In addition to the waxes, grease, by which term I mean an oil stiffened to a semisolid or plastic state by an agent such as a metallic soap, has also been found useful. Ordinary calcium-base cup grease has been employed, the lubricating oil in the grease apparently maintaining the spark current effectiveness of a liquid oil while at the same time the elimination of spray and the resulting fire hazard is also attained. The limitation of greases, as compared to the waxes, has been principally due to their softness and the grease is likely to be slung off the wheel. The quantity of soap used to stiffen the grease has not appeared to adversely affect the machining rate, and tests with soap alone showed that a fair cutting rate together with the filming advantages and the elimination of spray and fire hazard could be obtained. However, the odors were obnoxious and made the soaps, as well as some of the greases undesirable for use.

Various other materials in the semisolid group of high molecular weight hydrocarbons have been tested with varying results. Vaseline, for example, has also been tried and found usable. It has some tendency to be slung off the wheel and to that extent it is not, along with the cup greases, of the viscosity found available for testing, as satisfactory as the waxes previously mentioned under various temperature ranges encountered at the wheel surface.

From the foregoing, a range of equivalent dielectrics for particular installations should be apparent to those skilled in the art. Likewise the apparatus is subject to various forms of "outside machining." Thus in a lathe-like apparatus, the larger surface may be that of the rotating workpiece to which the semisolid dielectric is supplied, but as in the "grinding" apparatus, there is a transverse motion of one electrode surface past the other so that the dislodged particles are swept out.

I claim as my invention:

1. The method of shaping a metal workpiece which comprises urging the workpiece toward a side surface of a disk having a smooth face while at the same time providing a series of localized time-spaced, over-voltage initiated spark discharges between the disk face and the workpiece, rotating the disk at a velocity adequate to present different portions of the disk face to the workpiece at successive spark intervals, and coating the moving disk face with a dielectric material which is semisolid at the disk temperature to maintain a spark gap spacing between the workpiece and the disk.

2. The method of shaping a metal workpiece which comprises filming a rotary electrode wheel having a smooth porous surface with a self-restoring dielectric material which is semisolid at the wheel temperature, positioning the workpiece surface to be shaped adjacent a local area of the filmed wheel surface, rotating the wheel to change the surface area adjacent the workpiece surface, and providing a series of short, time-spaced, over-voltage initiated spark discharges across the spark gap maintained by the film between the workpiece and adjacent wheel area for dislodging workpiece particles.

3. The method of shaping a metal workpiece which comprises coating an electrode wheel having a porous surface with a self-restoring dielectric material which is semisolid at the wheel temperature, positioning the workpiece surface to be shaped adjacent a local area of the coated wheel surface, rotating the wheel to sweep different local areas of the wheel surface past the adjacent workpiece surface, providing a series of short, time-spaced, over-voltage initiated spark discharges between the wheel and the workpiece across the spark gap defined by the dielectric coating between them, and renewing the coating as the shaping proceeds by wiping a supply source of the dielectric material against the moving wheel.

4. The method of spark machining a metal workpiece which comprises coating a rotary metal disk having a smooth porous surface with a self-restoring dielectric material which is semisolid at the disk temperature, urging the workpiece surface to be machined adjacent a local area of the coated disk surface with a substantially constant pressure, rotating the disk to sweep different portions of the coated surface past the adjacent workpiece surface and maintain a localized spark gap between the disk and workpiece, providing a series of short, time-spaced, over-voltage initiated spark discharges across said spark gap for dislodging workpiece particles, and renewing the coating as the shaping proceeds by wiping a supply source of the dielectric against the moving disk.

5. The method of claim 1 in which the semisolid dielectric material is a stiff grease.

6. The method of claim 1 in which the semisolid dielectric material is micro-crystalline wax.

References Cited in the file of this patent

UNITED STATES PATENTS

| | | |
|---|---|---|
| 1,751,668 | Taylor | Mar. 25, 1930 |
| 1,770,540 | Lunn | July 15, 1930 |
| 1,909,079 | Steerup | May 16, 1933 |
| 2,015,415 | Steiner | Sept. 24, 1935 |
| 2,098,300 | May | Nov. 9, 1937 |
| 2,526,423 | Rudorff | Oct. 10, 1950 |
| 2,654,821 | Gillett | Oct. 6, 1953 |

FOREIGN PATENTS

| | | |
|---|---|---|
| 825,910 | France | Dec. 16, 1937 |
| 854,224 | France | Jan. 4, 1940 |
| 637,793 | Great Britain | May 24, 1950 |
| 1,024,353 | France | Jan. 10, 1953 |